United States Patent
Silverman

(10) Patent No.: US 10,198,956 B2
(45) Date of Patent: Feb. 5, 2019

(54) UNMANNED AERIAL VEHICLE COLLISION AVOIDANCE SYSTEM

(71) Applicant: Randy Lane Silverman, San Jose, CA (US)

(72) Inventor: Randy Lane Silverman, San Jose, CA (US)

( * ) Notice: Subject to any disclaimer, the term of this patent is extended or adjusted under 35 U.S.C. 154(b) by 16 days.

(21) Appl. No.: 15/290,838

(22) Filed: Oct. 11, 2016

(65) Prior Publication Data

US 2017/0301248 A1  Oct. 19, 2017

Related U.S. Application Data

(60) Provisional application No. 62/239,409, filed on Oct. 9, 2015.

(51) Int. Cl.

| | |
|---|---|
| *G08G 5/00* | (2006.01) |
| *G08G 5/04* | (2006.01) |
| *B64C 39/02* | (2006.01) |
| *G01S 13/93* | (2006.01) |
| *G01S 17/93* | (2006.01) |

(52) U.S. Cl.
CPC ........... *G08G 5/045* (2013.01); *G08G 5/0008* (2013.01); *G08G 5/0069* (2013.01); *G08G 5/0078* (2013.01); *B64C 39/024* (2013.01); *G01S 13/9303* (2013.01); *G01S 17/933* (2013.01)

(58) Field of Classification Search
None
See application file for complete search history.

(56) References Cited

U.S. PATENT DOCUMENTS

| | | | | |
|---|---|---|---|---|
| 4,918,442 | A * | 4/1990 | Bogart, Jr. | G01S 11/12 340/945 |
| 8,400,619 | B1 * | 3/2013 | Bachrach | G01C 1/04 356/4.01 |
| 9,729,252 | B2 * | 8/2017 | Tyler | H04B 11/00 |
| 2014/0007017 | A1 * | 1/2014 | Sternfeld | G06F 17/30241 715/848 |
| 2015/0206012 | A1 * | 7/2015 | Stout | G06K 9/00711 382/103 |
| 2015/0266575 | A1 * | 9/2015 | Borko | B64C 39/024 701/3 |
| 2016/0014360 | A1 * | 1/2016 | Dinev | H04N 5/372 348/311 |
| 2016/0071421 | A1 * | 3/2016 | Bousquet | G08G 5/0047 701/467 |
| 2016/0229341 | A1 * | 8/2016 | Singhal | B60R 1/00 |
| 2016/0244187 | A1 * | 8/2016 | Byers | B64C 39/024 |
| 2016/0247407 | A1 * | 8/2016 | Paczan | G08G 5/045 |
| 2016/0377381 | A1 * | 12/2016 | Lyren | F41G 3/04 345/633 |
| 2017/0061813 | A1 * | 3/2017 | Tao | G09B 9/08 |
| 2017/0190423 | A1 * | 7/2017 | Salgueiro | B64D 1/00 |
| 2017/0323572 | A1 * | 11/2017 | Chan | G08G 5/0034 |
| 2017/0331563 | A1 * | 11/2017 | Tyler | H04B 11/00 |

* cited by examiner

*Primary Examiner* — Rami Khatib
(74) *Attorney, Agent, or Firm* — Douglas L. Weller

(57) ABSTRACT

An automatic system to detect and avoid collisions between piloted aircraft operating at low altitudes and unmanned aerial vehicles (UAV). UAV's are typically remote controlled helicopters, quad-copters, airplanes and other airborne vehicles (e.g., Drones). Aircraft operating at low altitudes are subject to interference (accidental or purposefully) by those on the ground operating said UAV's, which is likely to cause great injury or death to the aircraft and its occupants.

20 Claims, 3 Drawing Sheets

UNMANNED AERIAL VEHICLE COLLISION AVOIDANCE SYSTEM

CROSS-REFERENCE TO RELATED APPLICATIONS

This application claims the benefit under 35 U.S.C. section 119(e) of U.S. Provisional Application No. 62/239,409, filed Oct. 9, 2015, the entirety of which is incorporated by reference herein for all purposes.

FIELD

An apparatus for the safe operation of piloted aircraft and radio controlled aircraft, radio controlled helicopters and other unmanned aerial vehicles operating in the same airspace.

BACKGROUND OF INVENTION

As unmanned aerial vehicles (e.g., drones) become pervasive, the chances increase that a drone may inadvertently or intentionally fly into a restricted air space. Drones are air vehicles with or without a human pilot. A Drone may fly autonomously, controlled by onboard computers, or may fly under remote human pilot control. Examples of restricted airspace include but are not limited to airports, airplane flight paths, no-fly zones, buildings/skyscrapers, military reservations, stadiums, private property, and other geographic boundaries. The Federal Aviation Administration (FAA) and state agencies continue to develop more guidelines and regulations for drone operations of all kinds (civil, commercial, recreational, etc.) in the United States. However, presently, there are no systems that effectively prevent or otherwise restrict a drone from flying into restricted air space.

When aircraft are operating at low altitudes, the high workload and decreased performance of the aircraft due to the slow airspeeds and close proximity to the ground makes it imperative that the airspace in and around the aircraft be free of distractions and dangers. The ability of the pilot to see and avoid such dangers may make it impossible to continue safe and controlled flight. Evasive maneuvers taken quickly to avoid collision with a drone could put the airplane into an unrecoverable spin or stall. In the event the drone is ingested into an engine or is hit by a propeller, the power plant of the aircraft is at risk. To this end, a method interrupting the intended flight path of a drone and causing the drone to be removed from the flight path of an aircraft increases the safety of those in the air and on the ground.

Accordingly, it would be desirable and useful to have a system able to detect UAV's in the flight path of piloted aircraft and warn the pilot of an impending collision.

SUMMARY OF THE INVENTION

According to an aspect of some embodiments of the present disclosure, there is provided an apparatus for detecting and avoiding an in-flight unmanned aerial vehicle (UAV) during operation by alerting a pilot of a piloted aircraft. The apparatus comprises a system processor configured to control operation of the apparatus. The system processor may comprise a central processing unit (CPU) and/or a data processor. The system processor controls the apparatus. Further, the apparatus comprises an image-detecting element comprising an image processing unit in communication with the system processor, the image-detecting element configured to capture a plurality of frames of visible images and the image processing unit configured to process the plurality of frames of visible images, wherein the image processing unit is further configured to detect a presence the in-flight unmanned aerial vehicle. Additionally, a transmitter controlled by the system processor and configured to transmit a signal to disrupt the in-flight operation of the detected unmanned aerial vehicle is provided. Lastly, the apparatus provides an alert signal to the pilot if the presence of the unmanned aerial vehicle is detected enabling the pilot to maneuver the piloted aircraft to avoid collision with the unmanned aerial vehicle if necessary.

According to another aspect of some embodiments of the present disclosure, there is provided a method for detecting and avoiding an in-flight unmanned aerial vehicle during operation by alerting a pilot of a piloted aircraft. The method comprises capturing an image stream in the visible spectrum via an image-detecting element, the image stream comprising at least one image frame. Once the frame is captured, processing the at least one image frame of the image stream via an image-processing unit in communication with a system processor is performed. The image processing unit scans the at least one image frame for a presence of the unmanned aerial vehicle. Next, a signal is transmitted to disrupt the in-flight operation of the detected unmanned aerial vehicle. If an unmanned aerial vehicle is detected, transmitting an alert signal to a pilot of the piloted aircraft upon determination of the presence of the unmanned aerial vehicle by the image-processing unit is performed.

BRIEF DESCRIPTION OF THE DRAWINGS

Accompanying drawings show embodiments in accordance with one or more aspects of the apparatus. However, the accompanying drawings should not be taken to limit the scope of the claims, but are for explanation and understanding only.

DETAILED DESCRIPTION OF THE TECHNICAL SOLUTION

Drones, as an example, are radio-controlled devices that depend on a signal from a transmitter, typically from a multi-axis handheld device, which transmits radio frequency (RF) signals to the drone to change its speed and direction. These signals are usually divided among multiple frequencies (e.g., spread spectrum) to avoid single channel interference. The proposed Drone Collision Avoidance System (DCAS) disclosed herein will detect an RF signature of a transmitter, possibly in combination with a look-ahead object detection (e.g., visual identification, heat signature or metallic radar returns) to enable a transmitter fitted to a piloted aircraft to emit a directed and/or tuned RF signal in the path of the aircraft to override any other control signal received by the drone. The DCAS system will reside onboard the piloted aircraft Generally, the DCAS would have three modes: 1) "Detect and Warn" (i.e., no RF is transmitted), 2) "Automatic" (i.e., at least detect and transmit), and 3) "Transmit On" full time and subject to a specified filter. In the case of the "Transmit On" filter, a location/speed system would be part of the DCAS that would contain a Global Positioning System (i.e., GPS) receiver and database of known airports and their respective GPS locations. This data along, with the altitude of the aircraft, would create a known region of safe operating environment, while turning off the DCAS transmitter when not in these regions. The database would be subject to regular updates of airport information, much the same way aeronautical charts are currently updated.

Figure 1:
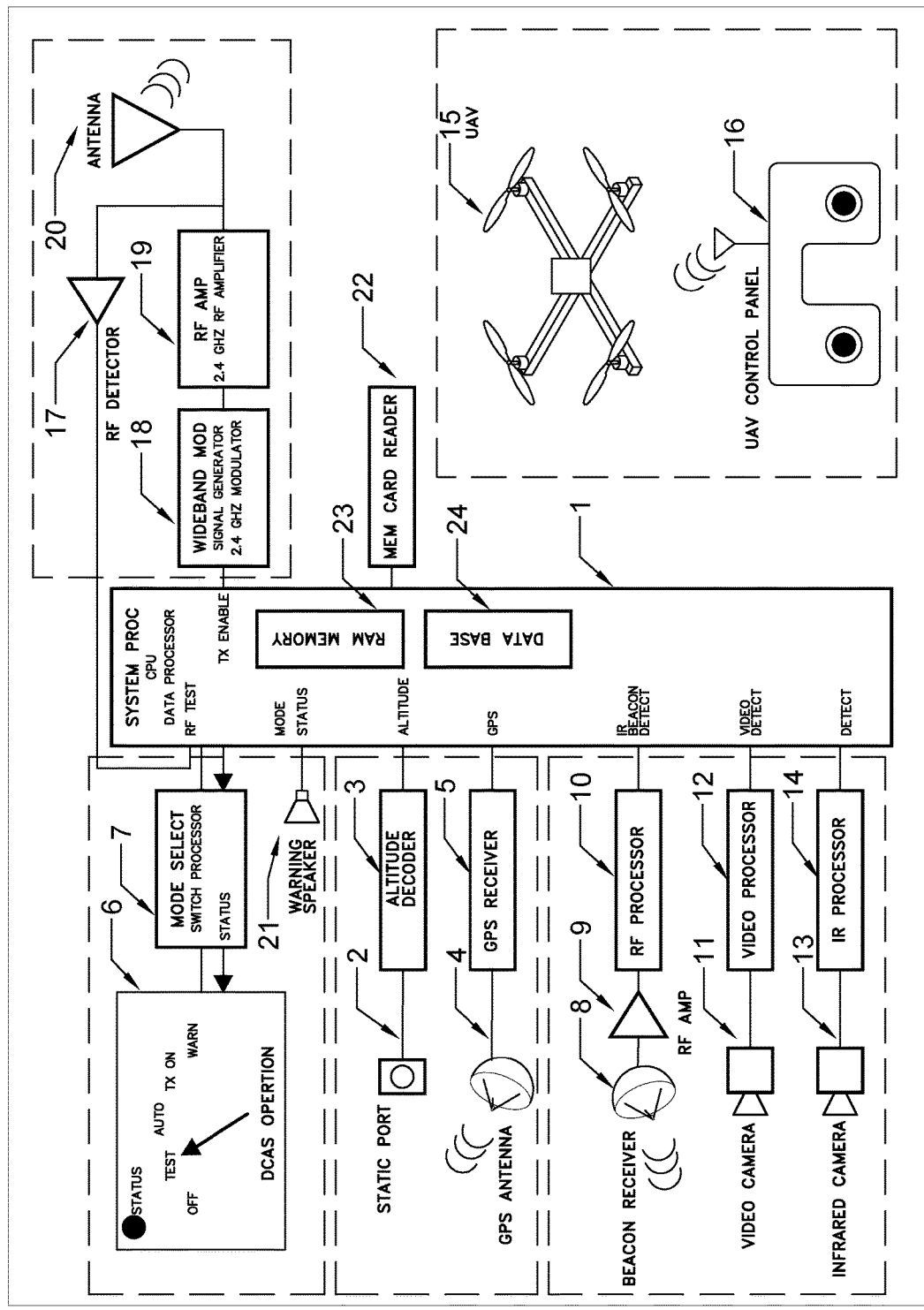
FIG. 1 is a block diagram of an auto-sensing solution to detect, warn and interrupt the control communication to an unmanned aerial vehicle (UAV) in accordance with the embodiment of the present invention.

Referring now to the drawings and in particular FIG. 1. The drone collision avoidance system for use in commercial aviation in and around an airport environment has an electronic circuit board with components dedicated to the purpose of this system. A central processing unit (CPU) 1 receives data from various sensors about the presence of UAV's. In particular, these sensors may be a processed signal from any combination of: 1) a beacon signal emitted by a beacon transmitter (not shown) arranged on the drone and received by a beacon receiver 8, 2) a processed frame from a plurality of frames of visible images received from a video camera 11, or 3) a processed frame from a plurality of frames of infrared (IR) images received from an infrared camera 13. Other sensors, such as a Light Imaging Detection and Range sensor (LIDAR) or radar may also be considered as acceptable UAV detecting sensors. Regardless of the type of sensor used, the sensor will be arranged in an appropriate location onboard the piloted aircraft. The CPU 1 receives input information or data from an RF processor 10 in the case of the beacon receiver 8, input information or data from a video processor 12 in the case of the video camera 11, or input information or data from an IR processor 14 in the case of the IR camera 11. If the received information indicates the presence of a drone, the CPU 1 generates an alert 21 and a wideband transmitter 18 is activated and a signal is transmitted.

All drones (e.g., UAV) will have a visual outline, recognizable shape, size envelope or profile. In addition to the aforementioned shape qualities, most UAV's have certain operational characteristics that distinguish them from other airborne objects such as birds and balloons. As seen in FIG. 1, a video camera 11 is aimed or oriented with a "forward looking" field of vision. The field of vision may be adjusted depending on the type of lens system is associated with the camera 11. For example, a wide-angle lens will provide the camera 11 with a larger field of vision. However, a larger field of vision may result in greater image processing by a visual processor 12 because of the greater amount of data collected for processing. Ideally, the lens system in combination with camera 11 should only gather enough information to detect a UAV in the immediate, to near immediate flight path of the aircraft. In some instances, the visual processor 11 may extrapolate the UAV's position at a later time to determine of a threat of collision exists.

The video camera 11 may be a single camera 11 or an array of at least two cameras 11. An array of cameras 11 has the advantage of being able to determine the location of the UAV (e.g., a depth map) relative to a piloted aircraft. Regardless of the camera 11 configurations, the camera 11 should be of sufficient sensitivity to detect a known UAV with a high probability of success and determine if there is a threat of collision. The camera 11 is connected either physically or wirelessly to the visual processor 12. The visual processor 12 uses known object detection methods to analyze individual frames of collected video content for drone presence. If an object is detected in a frame, or series of frames, the object will be compare against a known database of UAV outlines and if a reasonable match between the two occurs, a message is sent to the system processor 1.

In some instances, the propulsion system of the UAV will emit a certain heat signature. The heat signature is more prevalent in drones having a propulsion system based on an internal combustion or solid rocket, to name but a few. Other drone propulsion systems, such as battery-powered motors, may have a heat signature that is more difficult to detect. A second camera 13 (i.e., an IR camera, thermographic camera or thermal imaging camera) that is sensitive to heat signatures may also be used as a sensor to detect the presence of a UAV. The IR camera 13 measures infrared radiation (e.g., heat) and would need to be sufficiently sensitive to measure the small heat signature emitted by the propulsion system of some drones. Like the visual camera 11, the IR camera 13 would scan the forward-looking field of view but provide IR images to infrared image processor 14. The IR camera 13 is connected either physically or wirelessly to the visual processor 14. The IR processor 14 is configured to use known IR object detection and analysis methods to analyze individual frames of collected IR frame content for a drone presence. If an object is detected in a frame, or series of frames, the object will be compare against a known database of UAV propulsion system IR heat signatures and if a reasonable match between the two occurs, a message is sent to the system processor 1.

It is possible, and very likely to be mandated, that UAV's will be required to be equipped with an inexpensive low power RF transmitter 3 to emit a beacon signal which could be received by an aircraft antenna 8, amplified to a usable level with a gain adjustable amplifier 9 and the resulting signal fed into an RF Processor 10. The RF processor 10 with would demodulate and otherwise decode the signal, determine if the signal had been received by a drone and send a message is sent to the system processor 1.

The system processor 1 has additional data presented to it in the form of GPS position provided by a GPS antenna 4 and GPS receiver 5. The aircraft position is then compared to a known database of airport locations as part of the system processor decision logic [shown on FIG. 2]. The system processor 1 is also presented with the relative air pressure from static port 2 and processed by altitude decoder 3 and thus an estimated altitude (uncorrected for barometric pressure) is used as part of the system processor 1 decision logic [shown on FIG. 2].

The system processor database 4 will be updated on a known schedule to maintain a current an accurate set of data points which will be transferred in the system processor RAM memory 23 for use by the system processor 1. The system processor 1 also includes software instructions to operate the system, which may be located on a non-transitory computer readable medium. Additionally, as used herein, a "non-transitory computer readable medium" is meant to include all computer readable media, including but not limited to hard disks, compact disks, digital video disks, flash memory, random access memory, read-only memory, cache memory, and register memory; and to not include a transitory propagating signal.

A wideband RF modulator 18, under the on/off control of the system processor 1, with the frequency and modulation method capable of interrupting the flight commands from a control transmitter 16 to the UAV 3 is amplified 19 and fed to a forward facing antenna 20. The signal to the antenna 20 is also fed to an RF detector 17 as a confidence feedback to the system processor 1 that a signal is transmitting.

A warning system, under the on/off control of the system processor 1, consisting of a buzzer or message speaker 21 is to be located within hearing distance; also a status lamp 6, which can be also be used as a warning lamp, is located on a control panel in view of the flight crew.

The system will be equipped with a control panel 6 to select various modes of operation 7. Several of the possible modes of operation 7 for the system 1 are provided below, as items 1)-4).

1) A test mode evaluates the data from each sensor or processor and will activate the RF transmitter for a brief time to verify its proper operation. Fault messages will be in the form of a light pattern seen on the status panel lamp 6.

2) Auto mode engages a fully automatic operation where the said DCAS system will warn of a UAV incursion into the operating space of the aircraft and operate it's RF transmitter 18-19 in attempt to halt any intended operation by a UAV operator to pilot the UAV into a collision with the aircraft.

3) Force the transmitter to an ON state by the flight crew as a preventive countermeasure at any time.

4) Warn only; the RF transmitter 19 is disabled.

Figure 2:
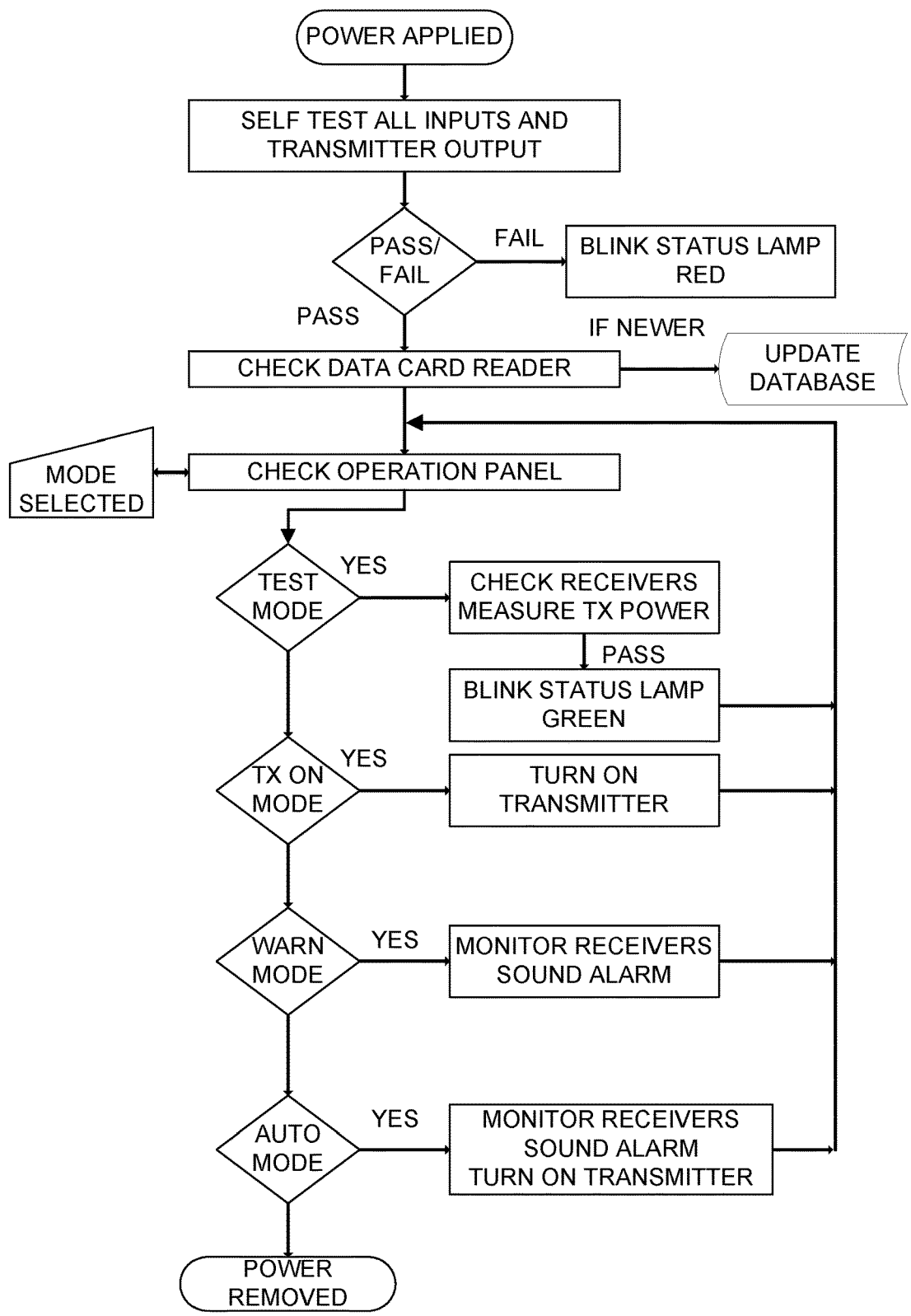
FIG. 2 is a pictorial representation of the sequence of operations of said sensing solution describing the signal flow and functions of the elements of the system.

A method of operating the DCAS system is shown in steps 200-236 of FIG. 2.

Figure 3:
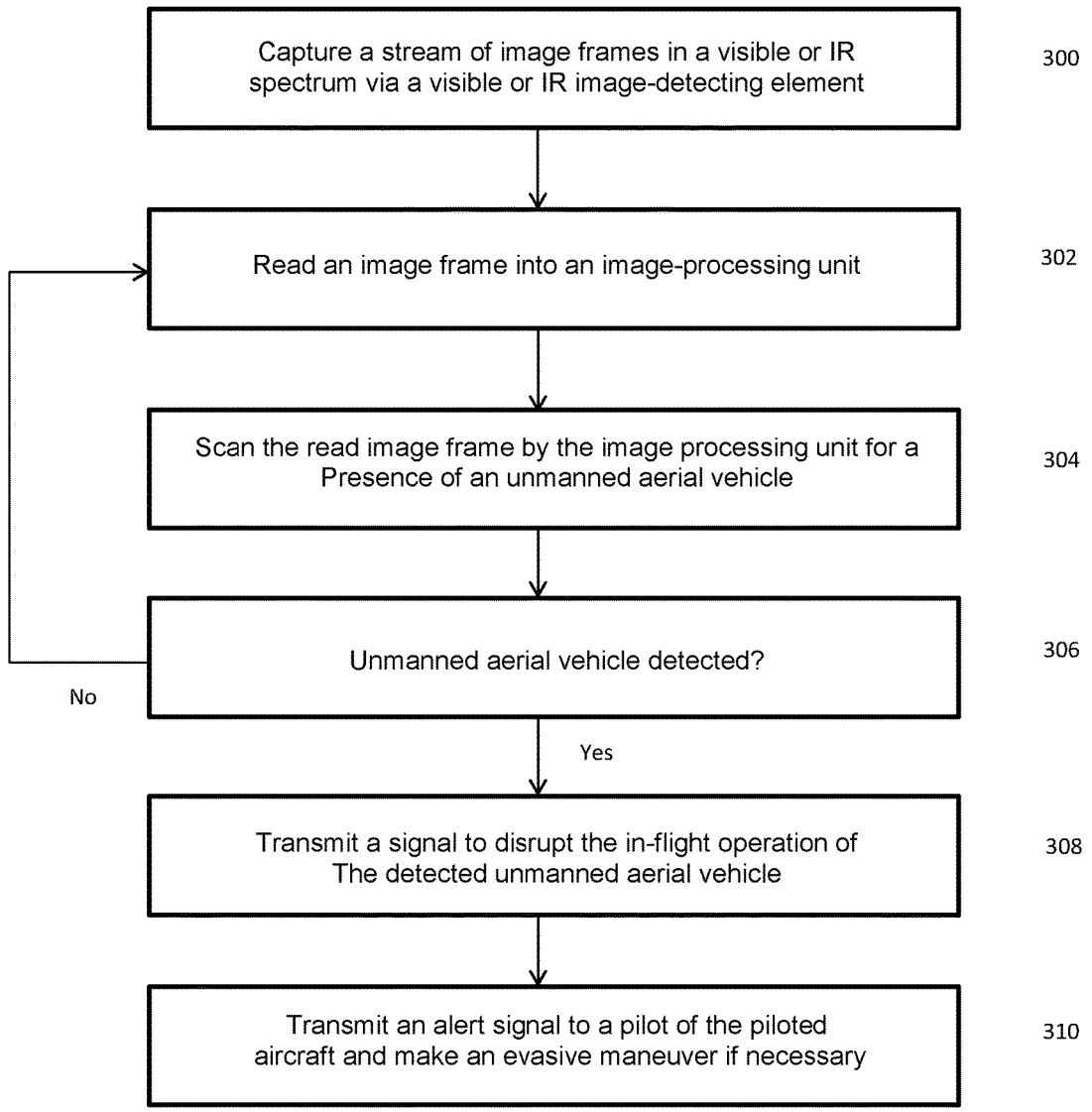
FIG. 3 shows a method to avoid a collision between an in-flight piloted aircraft and a UAV.

A method to avoid a collision between an in-flight piloted aircraft and an unmanned aerial vehicle is illustrated in FIG. 3. It will be understood by one skilled in the art that the method disclosed in steps 300-310 could include receiving a beacon signal by a beacon receive as a means of detecting a UAV in addition to a visible or IR camera.

While the foregoing describes embodiment(s) in accordance with one or more aspects of the invention, other and further embodiment(s) in accordance with the one or more aspects of the invention may be devised without departing from the scope thereof, which is determined by the claim(s) that follow and equivalents thereof. Further, while the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure. Claim(s) listing steps do not imply any order of the steps. Trademarks are the property of their respective owners.

What is claimed is:

1. An apparatus used in a piloted aircraft, the apparatus comprising:
    an image-detecting element configured to capture a plurality of frames of visible images in a forward looking field of vision that includes an immediate flight path of the piloted aircraft, process the plurality of frames of visible images, and scan one or more frames of the plurality of frames of visible images to detect a presence of an unmanned aerial vehicle (UAV);
    a system processor in communication with the image-detecting element determines whether the unmanned aerial vehicle in the forward looking field of vision presents a threat of collision and needs to be avoided by the piloted aircraft; and
        a transmitter controlled by the system processor and configured to transmit, in response to detecting, in the one or more frames, the presence of the unmanned aerial vehicle, a signal to interrupt flight commands sent to the unmanned aerial vehicle by a control transmitter for the unmanned aerial vehicle so as to remove the unmanned aerial vehicle from the immediate flight path of the piloted aircraft.

2. The apparatus as claimed in claim 1,
    wherein the image-detecting element comprises a video camera configured to detect images in a visible light spectrum, and an image-processing unit configured to analyze each frame of the plurality of frames of visible images to detect the presence of the unmanned aerial vehicle; and
    wherein the system processor is further configured to generate an alert signal in response to receiving an indication of the presence of the unmanned aerial vehicle, and providing the alert signal in a visual form, an audio form, or both.

3. The apparatus as claimed in claim 2, wherein the video camera comprises an image sensor capable of detecting the unmanned aerial vehicle.

4. The apparatus as claimed in claim 2, further comprising an infrared camera and an infrared image-processing unit communicating with the system processor, wherein the infrared camera is configured to capture the plurality of frames of infrared images, and wherein the infrared image-processing unit is configured to process each frame in the plurality of frames of infrared images by analyzing each frame for a presence of a heat signature of the unmanned aerial vehicle.

5. The apparatus as claimed in claim 1, further comprising a beacon receiver and a radio frequency processor communicating with the system processor, the beacon receiver configured to detect a beacon signal being transmitted by the unmanned aerial vehicle and the radio frequency processor configured to analyze and process the beacon signal.

6. The apparatus as claimed in claim 5, wherein the beacon signal is an electromagnetic signal, and wherein the radio frequency processor is configured to process the electromagnetic signal.

7. The apparatus as claimed in claim 1, further comprising a static port that communicates with the system processor via an altitude decoder to provide an altitude, relative to a ground, of the piloted aircraft.

8. The apparatus according to claim 1, wherein the apparatus is further configured to activate and/or deactivate itself.

9. The apparatus as claimed in claim 1, wherein the system processor comprises:
    a memory and a memory card reader;
    a processor configured to read a set of instructions stored in the memory and control the apparatus based on the set of instructions;
    an updatable database comprising unmanned aerial vehicle shape envelopes, parameter values for beacon signals, and heat signatures; and
    a wideband radio frequency modulator configured to generate a wideband radio frequency, and a radio frequency amplifier configured to amplify the wideband radio frequency.

10. The apparatus as claimed in claim 1, further comprising at least one of: a test mode, an auto mode, a transmit on mode, or a warn mode.

11. A method performed by a piloted aircraft, the method comprising:
    capturing, by the piloted aircraft, an image stream in a visible spectrum, the piloted aircraft using an image-detecting element of the piloted aircraft that is oriented to capture images within a forward looking field of vision that includes an immediate flight path of the piloted aircraft to capture the image stream, wherein the image stream comprises at least one image frame;

processing, by the piloted aircraft, the at least one image frame of the image stream, the piloted aircraft using an image-processing unit of the piloted aircraft that communicates with a system processor of the piloted aircraft;

scanning, by the piloted aircraft using the image-processing unit, the at least one image frame to detect a presence of an unmanned aerial vehicle (UAV) that presents a threat of collision and needs to be avoided by the piloted aircraft; and removing, by the piloted aircraft, the unmanned aerial vehicle from the flight path of the piloted aircraft, including the piloted aircraft using a transmitter of the piloted aircraft to transmit a signal to interrupt flight commands sent to the unmanned aerial vehicle by a control transmitter for the unmanned aerial vehicle.

12. The method as claimed in claim 11, further comprising:

receiving, at the system processor, an indication, from the image-processing unit, of a presence of the unmanned aerial vehicle, and causing a transmission of the signal to disrupt one or more in-flight operations of the unmanned aerial vehicle; and generating an alert signal in response to receiving the indication of the presence of the unmanned aerial vehicle, and providing the alert signal in a visual form, an audio form, or both.

13. The method as claimed in claim 12, further comprising: detecting, using an image sensor, the unmanned aerial vehicle.

14. The method as claimed in claim 11, wherein the image-detecting element is a video camera configured to detect images in a visible light spectrum.

15. The method as claimed in claim 14, wherein the video camera comprises an image sensor capable of detecting the unmanned aerial vehicle.

16. The method as claimed in claim 11, further comprising:

detecting a heat signature of the unmanned aerial vehicle via an infrared camera and an infrared image-processing unit, wherein the infrared camera is configured to capture a plurality of frames of infrared images, and wherein the infrared image-processing unit is configured to process each frame in the plurality of frames of infrared images by analyzing each frame for a presence of the heat signature of the unmanned aerial vehicle.

17. The method as claimed in claim 11, further comprising:

detecting, using a beacon receiver, a beacon signal that is transmitted by the unmanned aerial vehicle, wherein the beacon receiver is communicating with a radio frequency processor, which communicates with the system processor, wherein the radio frequency processor is configured to analyze and process the beacon signal.

18. The method as claimed in claim 17, wherein the beacon signal is an electromagnetic signal, the radio frequency processor is configured to process the electromagnetic signal and transmit a notification to the system processor if the beacon signal of the unmanned aerial vehicle is detected.

19. The method as claimed in claim 11, further comprising: providing, via a static port that communicates with the system processor via an altitude decoder, an altitude, relative to a ground, of the piloted aircraft.

20. The method as claimed in claim 11, further comprising: receiving, via a GPS receiver, GPS information about the piloted aircraft; and transmitting, via a GPS antenna, the GPS information about the piloted aircraft.

* * * * *